United States Patent
Tanaka et al.

(10) Patent No.: US 12,412,926 B2
(45) Date of Patent: Sep. 9, 2025

(54) ALL-SOLID-STATE SECONDARY BATTERY

(71) Applicant: TDK CORPORATION, Tokyo (JP)

(72) Inventors: Kazumasa Tanaka, Tokyo (JP);
Tomohiro Yano, Tokyo (JP)

(73) Assignee: TDK CORPORATION, Tokyo (JP)

( * ) Notice: Subject to any disclaimer, the term of this patent is extended or adjusted under 35 U.S.C. 154(b) by 546 days.

(21) Appl. No.: 17/295,604

(22) PCT Filed: Nov. 27, 2019

(86) PCT No.: PCT/JP2019/046379
§ 371 (c)(1),
(2) Date: May 20, 2021

(87) PCT Pub. No.: WO2020/111127
PCT Pub. Date: Jun. 4, 2020

(65) Prior Publication Data
US 2022/0021022 A1    Jan. 20, 2022

(30) Foreign Application Priority Data
Nov. 30, 2018    (JP) ................................. 2018-225662

(51) Int. Cl.
*H01M 10/0562* (2010.01)
*H01M 4/131* (2010.01)
(Continued)

(52) U.S. Cl.
CPC ....... *H01M 10/0562* (2013.01); *H01M 4/131* (2013.01); *H01M 4/364* (2013.01);
(Continued)

(58) Field of Classification Search
CPC ............. H01M 10/0562; H01M 4/131; H01M 4/364; H01M 4/366; H01M 4/505; H01M 4/525
(Continued)

(56) References Cited

U.S. PATENT DOCUMENTS

2012/0183853 A1* 7/2012 Chu ...................... H01M 4/525
252/182.1
2012/0321949 A1* 12/2012 Kawakami ........ H01M 10/0525
429/211
(Continued)

FOREIGN PATENT DOCUMENTS

JP    2006-351326 A    12/2006
JP    2009-181905 A     8/2009
(Continued)

OTHER PUBLICATIONS

English Translation of the Apr. 28, 2023 Office Action issued in Chinese Patent Application No. 201980076526.9.
(Continued)

*Primary Examiner* — Jonathan G Leong
*Assistant Examiner* — John S Medley
(74) *Attorney, Agent, or Firm* — Oliff PLC

(57) ABSTRACT

An all-solid-state lithium secondary battery includes a laminated body which has a positive electrode layer including a positive electrode current collector layer and a positive electrode active material layer, a negative electrode layer including a negative electrode current collector layer and a negative electrode active material layer, a solid electrolyte layer containing a solid electrolyte, and a margin layer that is disposed side by side with each of the positive electrode layer and the negative electrode layer and contains a solid electrolyte, in which the positive electrode layer and the negative electrode layer are alternately laminated with the solid electrolyte layer containing the solid electrolyte interposed therebetween, and the laminated body includes metal particles having an oxide film in the positive electrode active material layer, the negative electrode active material layer, the solid electrolyte layer, and the margin layer.

6 Claims, 1 Drawing Sheet

(51) Int. Cl.
  *H01M 4/36* (2006.01)
  *H01M 4/505* (2010.01)
  *H01M 4/525* (2010.01)
  *H01M 4/62* (2006.01)
  *H01M 10/0525* (2010.01)
  *H01M 4/02* (2006.01)

(52) U.S. Cl.
  CPC ........... *H01M 4/505* (2013.01); *H01M 4/525* (2013.01); *H01M 4/62* (2013.01); *H01M 10/0525* (2013.01); *H01M 2004/027* (2013.01); *H01M 2004/028* (2013.01); *H01M 2300/0065* (2013.01)

(58) Field of Classification Search
  USPC .......................................................... 429/304
  See application file for complete search history.

(56) References Cited

U.S. PATENT DOCUMENTS

| | | | | |
|---|---|---|---|---|
| 2014/0015173 | A1* | 1/2014 | Baba | B29C 65/02 |
| | | | | 264/614 |
| 2014/0363744 | A1* | 12/2014 | Vereecken | H01M 10/0562 |
| | | | | 423/625 |
| 2015/0056489 | A1* | 2/2015 | Babinec | H01M 50/103 |
| | | | | 429/144 |
| 2016/0141716 | A1* | 5/2016 | Ito | H01M 10/0562 |
| | | | | 429/162 |
| 2016/0204464 | A1* | 7/2016 | Cho | H01M 10/0583 |
| | | | | 29/623.5 |
| 2016/0329539 | A1* | 11/2016 | Kawaji | H01M 10/052 |
| 2016/0351910 | A1* | 12/2016 | Albano | H01M 10/052 |
| 2017/0098864 | A1* | 4/2017 | Ebisuzaki | H01M 10/0525 |
| 2017/0162854 | A1* | 6/2017 | Sugiura | H01M 10/0585 |
| 2018/0183065 | A1 | 6/2018 | Sasaki | |
| 2019/0267666 | A1* | 8/2019 | Shin | H01M 10/0562 |
| 2019/0334201 | A1* | 10/2019 | Senoue | H01M 4/386 |
| 2019/0363365 | A1* | 11/2019 | Chen | H01M 4/0423 |
| 2020/0365908 | A1 | 11/2020 | Shimada | |

FOREIGN PATENT DOCUMENTS

| | | | |
|---|---|---|---|
| JP | 2012-190588 A | 10/2012 | |
| JP | 2014-192041 A | 10/2014 | |
| JP | 2015060737 A * | 3/2015 | ............. Y02E 60/10 |
| JP | 2018-110098 A | 7/2018 | |
| WO | 2018/163514 A1 | 9/2018 | |
| WO | 2019/146413 A1 | 8/2019 | |

OTHER PUBLICATIONS

Mar. 3, 2020 International Search Report issued in International Patent Application No. PCT/JP2019/046379.

English-language translation of the Nov. 7, 2023 Office Action issued in Japanese Patent Application No. 2020-557782.

English Translation of Jan. 6, 2024 Decision of Rejection issued in Chinese Patent Application No. 201980076526.9.

English translation of Apr. 2, 2024 Office Action issued in Japanese Patent Application No. 2020-557782.

\* cited by examiner

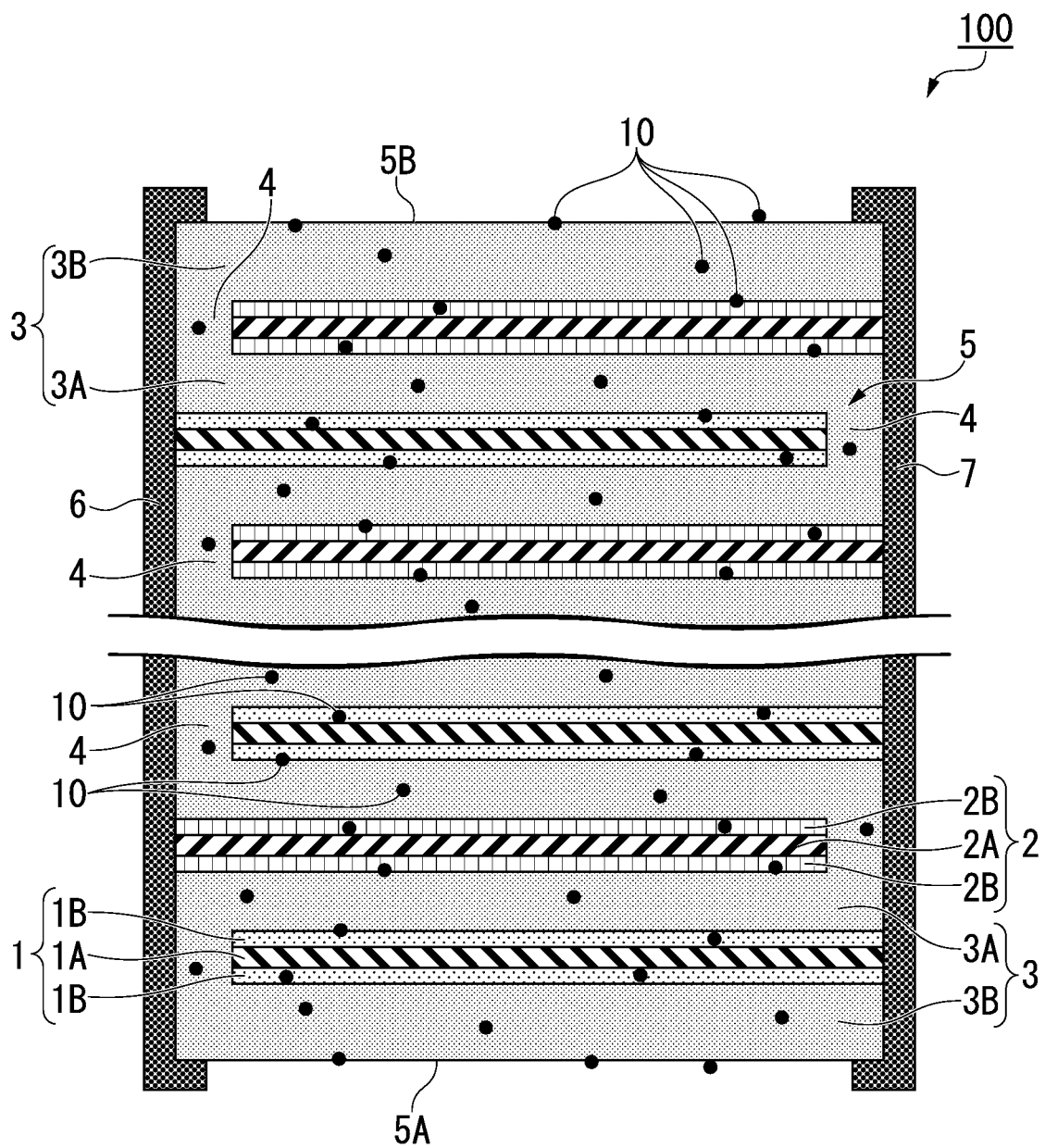

ALL-SOLID-STATE SECONDARY BATTERY

TECHNICAL FIELD

The present disclosure relates to an all-solid-state secondary battery.

Priority is claimed on Japanese Patent Application No. 2018-225662, filed in Japan on Nov. 30, 2018, the content of which is incorporated herein by reference.

BACKGROUND ART

In recent years, developments in electronics technology have been significant, and the size reduction, weight reduction, thickness reduction, and multi-functionalization of mobile electronic devices have been achieved. Accordingly, there has been an intense desire for size reduction, weight reduction, thickness reduction, and reliability improvement for batteries that serve as power sources of electronic devices, and all-solid-state lithium ion secondary batteries containing a solid electrolyte have been gaining attention.

Ordinarily, all-solid-state lithium ion secondary batteries are classified into two types, that is, thin film-type lithium ion secondary batteries and bulk-type lithium ion secondary batteries. Thin film-type lithium ion secondary batteries are produced by a thin-film technique such as the PVD method or the sol-gel method, and bulk-type lithium ion secondary batteries are produced by the powder compaction of an active material or a sulfide-based solid electrolyte having a low grain boundary resistance. However, thin film-type lithium ion secondary batteries have a problem of a small capacity and a high manufacturing cost because of a difficulty in thickening an active material layer and increasing the number of layers laminated.

On the other hand, in bulk-type lithium ion secondary batteries, since a sulfide-based solid electrolyte is used, and hydrogen sulfide is generated during a reaction between this sulfide-based solid electrolyte and water, it is difficult to handle bulk-type lithium ion secondary batteries in the atmosphere, which has created a need for producing the batteries in glove boxes with a controlled dew point. In addition, it is difficult to produce the batteries in a sheet shape, and thus there is a problem with the thickness reduction of solid electrolyte layers and an increase in the number of layers in the batteries.

Regarding the case of oxide-based solid electrolytes that are chemically stable in the atmosphere, a method for manufacturing a multilayer capacitor can be applied, and it is possible to manufacture, for example, a laminated-type all-solid-state secondary battery in which a positive electrode layer made up of a positive electrode active material layer and a positive electrode current collector layer, a solid electrolyte layer, and a negative electrode made up of a negative electrode active material layer and a negative electrode current collector layer are laminated. For example, a laminated-type all-solid-state secondary battery has been manufactured by applying a slurry in which a constituent material of each member is kneaded with a binder and a solvent by screen printing or a doctor blade method, processing the slurry into a sheet shape, laminating the slurry sheets, and firing the laminate (for example, Patent Literature 1).

CITATION LIST

Patent Literature

[Patent Literature 1]
Japanese Unexamined Patent Application, First Publication No. 2014-192041
[Patent Literature 2]
Japanese Unexamined Patent Application, First Publication No. 2009-181905

SUMMARY OF DISCLOSURE

Technical Problem

However, since the thermal conductivity of a material that constitutes the all-solid-state secondary battery is low, it is difficult to uniformly dissipate heat generated from a battery reaction. Therefore, non-uniformity between the internal temperature and the battery surface temperature of the laminated-type all-solid-state secondary battery having a number of layers laminated is likely to be high. Therefore, the migration speed of lithium ions inside the battery varies between the high-temperature part and the low-temperature part, and the migration of lithium ions is accelerated in the high-temperature part, which creates a problem with the deterioration of the battery being accelerated in the high-temperature part. Therefore, excellent cycle characteristics are not easily obtained.

Regarding such a problem of the heat dissipation property of all-solid-state secondary batteries, Patent Literature 2 reports that the above-described problem can be solved by forming layers having 50 vol % or more of pores in current collectors formed on both electrodes of a positive electrode and a negative electrode. However, in all-solid-state secondary batteries in which the layers having pores are formed, there has been a problem in that the electron conductivity decreases and desired charge and discharge capacities are difficult to be obtained.

An objective of the present disclosure is to provide an all-solid-state secondary battery that highly uniformly dissipates heat generated from a battery reaction.

Solution to Problem

In order to solve the above-described technical problems, the present disclosure provides the following means.

(1) An all-solid-state secondary battery according to the present disclosure including a laminated body which has a positive electrode layer including a positive electrode current collector layer and a positive electrode active material layer, a negative electrode layer including a negative electrode current collector layer and a negative electrode active material layer, a solid electrolyte layer containing a solid electrolyte, and a margin layer that is disposed side by side with each of the positive electrode layer and the negative electrode layer and contains a solid electrolyte, in which the positive electrode layer and the negative electrode layer are alternately laminated with the solid electrolyte layer interposed between, in which the laminated body includes metal particles having an oxide film in at least any layer of the positive electrode active material layer, the negative electrode active material layer, the solid electrolyte layer, and the margin layer.

(2) In the all-solid-state secondary battery according to (1), the metal particles having the oxide film may be also provided in surfaces of the laminated body at both ends in a lamination direction.

(3) In the all-solid-state secondary battery according to any of (1) or (2), an average particle diameter of the metal particles having the oxide film may be 0.1 μm to 20 μm.

(4) In the all-solid-state secondary battery according to any of (1) to (3), an average thickness of the oxide film may be 10% or less of an average particle diameter of the metal particles and may be within a range of 0.001 μm to 2 μm.

(5) In the all-solid-state secondary battery according to any of (1) to (4), the metal particles may contain at least one element selected from copper, nickel, silver, platinum, iron, aluminum, bismuth, and palladium.

(6) In the all-solid-state secondary battery according to any of (1) to (5), a content of the metal particles may be 0.1% to 10% by weight with respect to a weight of the all-solid-state secondary battery.

Advantageous Effects of Disclosure

According to the present disclosure, it is possible to provide an all-solid-state secondary battery that highly uniformly dissipates heat generated from a battery reaction.

BRIEF DESCRIPTION OF DRAWINGS

FIG. 1 is an enlarged cross-sectional view schematically showing a main part of an all-solid-state secondary battery according to the present embodiment.

DESCRIPTION OF EMBODIMENTS

Hereinafter, the present embodiment will be described in detail with reference to the drawing. In the drawing to be used in the following description, there is a case where a characteristic portion is shown in an enlarged manner for convenience in order to facilitate the understanding of the characteristics of the present embodiment, and the dimensional ratio and the like of each constituent element are different from actual ones in some cases.

A material, a dimension, and the like exemplified in the following description are simply examples, and the present disclosure is not limited thereto and can be appropriately modified and carried out as long as the effect of the present disclosure is exhibited.

As all-solid-state secondary batteries, an all-solid-state lithium ion secondary battery, an all-solid-state sodium ion secondary battery, an all-solid-state magnesium ion secondary battery, and the like are exemplified. Hereinafter, an all-solid-state lithium ion secondary battery will be described as an example, but the present disclosure is ordinarily applicable to all-solid-state secondary batteries.

FIG. 1 is an enlarged cross-sectional view schematically showing a main part of an all-solid-state secondary battery according to the present embodiment.

The all-solid-state lithium ion secondary battery shown in FIG. 1 includes a laminated body having a first electrode layer, a second electrode layer, and a solid electrolyte. Hereinafter, one of the first electrode layer and the second electrode layer functions as a positive electrode, and the other functions as a negative electrode. Whether an electrode layer is positive or negative depends on the polarity that is connected to the external terminal. Hereinafter, in order to facilitate understanding, in the description, the first electrode layer will be regarded as a positive electrode layer, and the second electrode layer will be regarded as a negative electrode.

An all-solid-state lithium ion secondary battery 100 includes a laminated body 5 which has positive electrode layers 1 each including a positive electrode current collector layer 1A and positive electrode active material layers 1B, negative electrode layers 2 each including a negative electrode current collector layer 2A and negative electrode active material layers 2B, solid electrolyte layers 3 containing a solid electrolyte, and margin layers 4 that are disposed side by side with each of the positive electrode layers 1 and the negative electrode layers 2 and contain a solid electrolyte, in which the positive electrode layers 1 and the negative electrode layers 2 are alternately laminated with the solid electrolyte layer 3 containing the solid electrolyte interposed therebetween, and the laminated body 5 includes metal particles 10 having an oxide film in the positive electrode active material layers 1B, the negative electrode active material layers 2B, the solid electrolyte layers 3, and the margin layers 4.

The positive electrode layers 1 are each connected to a first external terminal 6, and the negative electrode layers 2 are each connected to a second external terminal 7. The first external terminal 6 and the second external terminal 7 are electrical contact points with the outside.

(Laminated Body)

The laminated body 5 has the positive electrode layers 1, the negative electrode layers 2, the solid electrolyte layers 3, the margin layers 4, and the metal particles 10 having an oxide film.

The positive electrode layers 1 and the negative electrode layers 2 in the laminated body 5 are alternately laminated with the solid electrolyte layer 3 (in more detail, an interlayer solid electrolyte layer 3A) therebetween. The all-solid-state lithium ion secondary battery 100 is charged and discharged by the exchange of lithium ions between the positive electrode layers 1 and the negative electrode layers 2 through the solid electrolyte layers 3.

(Positive Electrode Layer and Negative Electrode Layer)

The positive electrode layer 1 has a positive electrode current collector layer 1A and positive electrode active material layers 1B containing a positive electrode active material. The negative electrode layer 2 has a negative electrode current collector layer 2A and negative electrode active material layers 2B containing a negative electrode active material.

The positive electrode current collector layer 1A and the negative electrode current collector layer 2A are formed of at least one substance having a high conductivity. Examples of the substance having a high conductivity include metals or alloys containing at least one metal element of silver (Ag), palladium (Pd), gold (Au), platinum (Pt), aluminum (Al), copper (Cu), and nickel (Ni) and non-metals such as carbon (C). Among these metal elements, when not only high conductivity but also the manufacturing cost are taken into account, copper and nickel are preferred in some embodiments. Furthermore, copper does not easily react with positive electrode active materials, negative electrode active materials, and solid electrolytes. Therefore, when copper is used for the positive electrode current collector layer 1A and the negative electrode current collector layer 2A, it is possible to reduce the internal resistance of the all-solid-state lithium ion secondary battery 100. The substances that form the positive electrode current collector layer 1A and the negative electrode current collector layer 2A may be identical to or different from each other. The thicknesses of the positive electrode current collector layer 1A and the negative electrode current collector layer 2A are not particularly limited and are within a range of 0.5 μm or larger and 30 μm or smaller as a rough standard.

The positive electrode active material layer 1B is formed on one surface or both surfaces of the positive electrode current collector layer 1A. For example, on the positive electrode layer 1 positioned in the uppermost layer in the lamination direction of the all-solid-state lithium ion secondary battery 100, there is no negative electrode layer 2 facing the positive electrode layer 1 from the upper side in the lamination direction. Therefore, in the positive electrode layer 1 positioned in the uppermost layer of the all-solid-state lithium ion secondary battery 100, the positive electrode active material layer 1B needs to be provided on only one surface on the lower side in the lamination direction, but may be provided on both surfaces in the lamination direction. The negative electrode active material layer 2B is also, similarly to the positive electrode active material layer 1B, formed on one surface or both surfaces of the negative electrode current collector layer 2A. The thicknesses of the positive electrode active material layer 1B and the negative electrode active material layer 2B may be within a range of 0.5 or larger and 5.0 μm or smaller. When the thicknesses of the positive electrode active material layer 1B and the negative electrode active material layer 2B are set to 0.5 μm or larger, it is possible to increase the electric capacity of the all-solid-state lithium ion secondary battery. When the thicknesses are set to 5.0 μm or smaller, since the diffusion distance of lithium ions becomes short, it is possible to further reduce the internal resistance of the all-solid-state lithium ion secondary battery.

The positive electrode active material layer 1B and the negative electrode active material layer 2B each contain a positive electrode active material or a negative electrode active material that exchanges electrons with lithium ions. Additionally, the positive electrode active material layer 1B and the negative electrode active material layer 2B each may contain a conductive assistant, a conductive ion auxiliary agent, or the like. The positive electrode active material and the negative electrode active material are preferably capable of efficiently intercalating and deintercalating lithium ions.

Between the active materials that form the positive electrode active material layer 1B or the negative electrode active material layer 2B, there is no clear discrimination, and it is possible to compare the potentials of two compounds, use the compound exhibiting a higher potential as the positive electrode active material, and use the compound exhibiting a lower potential as the negative electrode active material. Therefore, hereinafter, active materials will be collectively described.

As the active materials, it is possible to use transition metal oxides, transition metal complex oxides, and the like. Examples of the transition metal oxides and the transition metal complex oxides include lithium manganese complex oxides $Li_2Mn_aMa_{1-a}O_3$ (0.8≤a≤1, Ma=Co, Ni), lithium cobalt oxide ($LiCoO_2$), lithium nickel oxide ($LiNiO_2$), lithium manganese spinel ($LiMn_2O_4$), complex metal oxides represented by General Formula: $LiNi_xCo_yMn_zO_2$ (x+y+z=1, 0≤x≤1, 0≤y≤1, 0≤z≤1), a lithium vanadium compound ($LiV_2O_5$), olivine-type $LiM_bPO_4$ (here, Mb is one or more elements selected from Co, Ni, Mn, Fe, Mg, Nb, Ti, Al, and Zr), lithium vanadium phosphate ($Li_3V_2(PO_4)_3$ or $LiVOPO_4$), Li-rich solid solution positive electrodes represented by $Li_2MnO_3$-$LiM_cO_2$ ($M_c$=Mn, Co, or Ni), lithium titanate ($Li_4Ti_5O_{12}$), complex metal oxides represented by $Li_sNi_tCo_uAl_vO_2$ (0.9<s<1.3, 0.9<t+u+v<1.1), and the like.

Additionally, in addition to the above-described complex metal oxides, examples of the transition metal oxides and the transition metal complex oxides include metals, alloys, and metal oxides such as metallic Li, an Li—Al alloy, an Li—In alloy, carbon, silicon (Si), silicon oxides ($SiO_x$), and titanium oxide ($TiO_2$).

As the active materials of the present embodiment, a phosphate compound is preferably contained as a main component, for example, any one or a plurality of lithium vanadium phosphate ($LiVOPO_4$, $Li_3V_2(PO_4)_3$, or $Li_4(VO)(PO_4)_2$), lithium vanadium pyrophosphate ($Li_2VOP_2O_7$ or $Li_2VP_2O_7$), and $Li_9V_3(P_2O_7)_3(PO_4)_2$ is preferred, and, particularly, one or both of $LiVOPO_4$ and $Li_3V_2(PO_4)_3$ are preferred in some embodiments.

The main component in the present embodiment refers to the fact that the percentage of the phosphate compound in all of the active materials in the active material layers is more than 50 parts by mass, and the percentage of the phosphate compound is preferably 80 parts by mass or more in some embodiments.

In addition, a part of each element of these active materials may be displaced by a heterogeneous element and these active materials may change the stoichiometric composition. $LiVOPO_4$ and $Li_3V_2(PO_4)_3$ are preferably deficient in lithium and more preferably $Li_xVOPO_4$ (0.94≤x≤0.98) and $Li_xV_2(PO_4)_3$ (2.8≤x≤2.95) in some embodiments.

Examples of the conductive assistant include carbon materials such as carbon black, acetylene black, ketjen black, carbon nanotubes, graphite, graphene, and activated carbon and metal materials such as gold, silver, palladium, platinum, copper, and tin.

The conductive ion auxiliary agent is, for example, a solid electrolyte. As this solid electrolyte, specifically, it is possible to use, for example, the same material as the material that is used for the solid electrolyte layer 3.

In the case of using a solid electrolyte as the conductive ion auxiliary agent, it is preferable to use the same material as the conductive ion auxiliary agent and the solid electrolyte that is used for the solid electrolyte layer 3 in some embodiments.

The positive electrode current collector layer 1A and the negative electrode current collector layer 2A may contain a positive electrode active material and a negative electrode active material, respectively. The content ratio between each current collector and the active material that is contained in each current collector is not particularly limited as long as the current collector appropriately functions. For example, the volume ratio between the positive electrode current collector and the positive electrode active material or between the negative electrode current collector and the negative electrode active material is preferably within a range of 90/10 to 70/30.

When the positive electrode current collector layer 1A and the negative electrode current collector layer 2A contain the positive electrode active material and the negative electrode active material, respectively, the adhesiveness between the positive electrode current collector layer 1A and the positive electrode active material layer 1B and the adhesiveness between the negative electrode current collector layer 2A and the negative electrode active material layer 2B improve.

(Solid Electrolyte Layer)

As shown in FIG. 1, the solid electrolyte layer 3 has interlayer solid electrolyte layers 3A that are each positioned between the positive electrode active material layer 1B and the negative electrode active material layer 2B.

In addition, the solid electrolyte layer 3 may further have an outermost solid electrolyte layer 3B positioned on at least one outside (both outsides in FIG. 1) of the positive electrode layer 1 (positive electrode current collector layer 1A) and the negative electrode layer 2 (negative electrode current collector layer 2A). Here, the "outside" refers to the outside of the positive electrode layer 1 or the negative electrode layer 2 that is closest to a surface 5A or 5B of the laminated body 5.

The solid electrolyte layer 3 may not have the outermost solid electrolyte layer 3B, and, in this case, the surfaces 5A and 5B of the laminated body 5 become the positive electrode layer 1 and the negative electrode layer 2.

For the solid electrolyte layer 3, a solid electrolyte material having a small electron conductivity and a high lithium ion conductivity is preferably used, and it is possible to use an ordinary solid electrolyte material, for example, an oxide-based lithium ion conductor having a NASICON-type, garnet-type, or perovskite-type crystal structure. As the lithium ion conductor having a NASICON-type crystal structure, at least one of an ion conductor having a NASICON-type crystal structure containing at least Li, M (M is at least one of Ti, Zr, Ge, Hf, and Sn), P, and O, an ion conductor having a garnet-type crystal structure containing at least Li, Zr, La, and O, an ion conductor having a garnet-type similar structure, and an ion conductor having a perovskite-type structure containing at least Li, Ti, La, and O is exemplified. In other words, one of these ion conductors may be used, or two or more ion conductors may be mixed and used.

As the solid electrolyte material of the present embodiment, the lithium ion conductor having a NASICON-type crystal structure is preferably used, and, for example, a solid electrolyte material represented by $LiTi_2(PO_4)_3$ (LTP), $LiZr_2(PO_4)_3$ (LZP), $Li_{1+x}Al_xTi_{2-x}(PO_4)_3$ (LATP, $0<x\leq0.6$), $Li_{1+x}Al_xGe_{2-x}(PO_4)_3$ (LAGP, $0<x\leq0.6$), or $Li_{1+x}Y_xZr_{2-x}(PO_4)_3$ (LYZP, $0<x\leq0.6$) may be contained.

In addition, the solid electrolyte layer 3 may be selected in accordance with the active materials that are used for the positive electrode layer 1 and the negative electrode layer 2. For example, the solid electrolyte layer 3 may contain the same element as the element that forms the active materials. When the solid electrolyte layer 3 contains the same element as the element that forms the active materials, the positive electrode active material layer 1B and the negative electrode active material layer 2B are strongly joined to the solid electrolyte layer 3 at the interfaces. In addition, it is possible to increase the contact areas in the interfaces between the positive electrode active material layer 1B and the solid electrolyte layer 3 and between the negative electrode active material layer 2B and the solid electrolyte layer 3.

The thickness of the interlayer solid electrolyte layer 3A may be within a range of 0.5 μm or larger and 20.0 μm or smaller. When the thickness of the interlayer solid electrolyte layer 3A is set to 0.5 μm or larger, it is possible to reliably prevent a short circuit between the positive electrode layer 1 and the negative electrode layer 2. When the thickness is are set to 20.0 μm or smaller, since the migration distance of lithium ions becomes short, it is possible to further reduce the internal resistance of the all-solid-state lithium ion secondary battery.

The thickness of the outermost solid electrolyte layer 3B is not particularly limited and may be the same thickness of the interlayer solid electrolyte layer 3A, that is, within a range of 0.5 μm or larger and 20.0 μm or smaller.

(Margin Layer)

The margin layers 4 contain a solid electrolyte and are disposed side by side with the positive electrode layers 1 and the negative electrode layers 2 respectively. The solid electrolyte that is contained in the margin layers 4 may be identical to or different from the solid electrolyte that is contained in the solid electrolyte layer 3.

The margin layers 4 may be provided to resolve the length difference between the interlayer solid electrolyte layer 3A and the positive electrode layer 1 and the length difference between the interlayer solid electrolyte layer 3A and the negative electrode layer 2. Therefore, the margin layers 4 are formed in regions except the positive electrode layers 1 and the negative electrode layers 2 on the main surfaces of the solid electrolyte layers 3 in substantially the same height as the positive electrode layer 1 or the negative electrode layer 2 (that is, so as to be disposed side by side with each of the positive electrode layers 1 and the negative electrode layers 2). Since the presence of the margin layers 4 resolves the length differences between the solid electrolyte layer 3 and the positive electrode layer 1 and between the solid electrolyte layer 3 and the negative electrode layer 2, the denseness between the solid electrolyte layer 3 and each electrode layer becomes high, and interlayer peeling (delamination) or warpage caused by the firing of the all-solid-state battery is less likely to occur.

The material that forms the margin layers 4 may contain, for example, titanium aluminum lithium phosphate that is the same material as the solid electrolyte layer 3. Therefore, the titanium aluminum lithium phosphate is preferably $Li_{1+x}Al_xTi_{2-x}(PO_4)_3$ ($0\leq x\leq0.6$). In addition, the solid electrolyte layer 3 may contain a solid electrolyte material other than the titanium aluminum lithium phosphate. For example, the solid electrolyte layer 3 may contain at least one selected from the group consisting of $Li_{3+x1}Si_{x1}P_{1-x1}O_4$ ($0.4\leq x1\leq0.6$), $Li_{3.4}V_{0.4}Ge_{0.6}O_4$, lithium germanium phosphate ($LiGe_2(PO_4)_3$), $Li_2O$—$V_2O_5$—$SiO_2$, $Li_2O$—$P_2O_5$—$B_2O_3$, $Li_3PO_4$, $Li_{0.5}La_{0.5}TiO_3$, $Li_{14}Zn(GeO_4)_4$, and $Li_7La_3Zr_2O_{12}$.

(Metal Particles Having Oxide Film)

The metal particles 10 having an oxide film facilitate the dissipation of heat generated from a battery reaction. As a result, the heat distribution in the all-solid-state secondary battery becomes uniform, the uniformity of lithium ion migration caused by a charge and discharge reaction also improves, and excellent cycle characteristics can be obtained.

In addition, the metal particles 10 having an oxide film have an insulating property and thus do not cause any short circuits. Metal particles having no oxide film are not capable of guaranteeing the insulating property and thus cause a short circuit in some cases.

In the all-solid-state lithium ion secondary battery 100 shown in FIG. 1, the metal particles 10 having an oxide film are present in the positive electrode active material layers 1B, the negative electrode active material layers 2B, the solid electrolyte layers 3, and the margin layers 4, but may be present in any of the positive electrode active material layers 1B, the negative electrode active material layers 2B, the solid electrolyte layers 3, and the margin layers 4.

In a case where the metal particles 10 having an oxide film are positioned in an interface between the positive electrode active material layer 1B and the solid electrolyte layer 3 or in an interface between the negative electrode active material layer 2B and the solid electrolyte layer 3 to straddle both layers, the metal particles 10 having an oxide film are regarded as being present in both layers.

In order to enhance the uniformity of heat dissipation, the metal particles 10 having an oxide film may be present in all of the positive electrode active material layers 1B, the negative electrode active material layers 2B, the solid electrolyte layers 3, and the margin layers 4.

In the all-solid-state lithium ion secondary battery 100 shown in FIG. 1, the metal particles 10 having an oxide film are also present in the surfaces 5A and 5B, which are both ends of the laminated body in the lamination direction. In the all-solid-state lithium ion secondary battery 100 shown in FIG. 1, the metal particles 10 having an oxide film are present in both the surface 5A and the surface 5B of the laminated body, but may be present in only one surface.

The metal particles 10 having an oxide film that are present in the surfaces 5A and 5B of the laminated body are capable of preferably emitting heat generated from a battery reaction to the outside.

The aspect in which the metal particles having an oxide film are present in the surfaces of the laminated body is not particularly limited and may be an aspect in which almost all of the metal particles having an oxide film are placed on the surfaces or an aspect in which a part of the metal particles having an oxide film are exposed on the surfaces.

The average particle diameter of the metal particles having an oxide film may be 0.1 μm to 20 μm.

This is because, when the average particle diameter is 0.1 μm or larger, a desired heat dissipation property can be obtained, and consequently, excellent cycle characteristics can be obtained. In addition, this is because, when the average particle diameter is 20 μm or smaller, the metal particles having an oxide film are likely to be uniformly dispersed in the all-solid-state secondary battery, and a desired heat dissipation property is likely to be obtained.

Methods for measuring the average particle diameter of the metal particles having an oxide film will be described. (In a Case where the Metal Particles Having an Oxide Film are Included Inside the Laminated Body in the all-Solid-State Secondary Battery)

In order to observe the metal particles having an oxide film inside the laminated body of the all-solid-state secondary battery, an arbitrary cross section is cut out by, for example, an ion milling process or a cross section polisher (CP) process, and the metal particles having an oxide film can be specified by an analysis of, for example, a reflected electron image (COMPO), X-ray photoelectron spectroscopy (XPS), or an electron probe microanalyzer (EPMA). Next, the diameters of the metal particles having an oxide film are measured from the distances between two arbitrary points by, for example, field emission scanning electron microscope (FE-SEM) observation, and the average particle diameter of the metal particles having an oxide film can be calculated from a predetermined number of measurement points, for example, 20 measurement points (n=20).
(In a Case where the Metal Particles Having an Oxide Film are Included in the Surfaces at Both Ends in the Lamination Direction of the Laminated Body in the all-Solid-State Secondary Battery)

In order to observe the metal particles having an oxide film in the surfaces at both ends in the lamination direction of the laminated body in the all-solid-state secondary battery, the metal particles having an oxide film are specified by an analysis of, for example, COMPO, XPS, or EPMA, next, the diameters of the metal particles having an oxide film are measured from the distances between two arbitrary points by, for example, FE-SEM observation, and the average particle diameter of the metal particles can be calculated from a predetermined number of measurement points, for example, 20 measurement points (n=20).

In addition, the metal particles present on the surfaces of the all-solid-state secondary battery are lustrous and thus can be easily discriminated with a microscope (stereoscopic microscope), and the average particle diameter may be calculated by the same method.

The average thickness of the oxide film may be 10% or less of the average particle diameter of the metal particles having an oxide film and within a range of 0.001 μm to 2 μm.

This is because, in a case where the average thickness of the oxide film is 10% or less of the average particle diameter of the metal particles having an oxide film, the metal particles have an excellent heat dissipation property while maintaining the insulating property. When the thickness of the oxide film is 0.001 μm or larger, it is possible to guarantee the insulating property, and short circuiting is prevented. In addition, when the average thickness of the oxide film is 2 μm or smaller, it is possible to avoid the degradation of the heat dissipation property of the metal particles while guaranteeing the insulating property.

The "average thickness" refers to the average of the thicknesses of oxide films measured from a predetermined number, for example, 20 metal particles.

The thickness of the oxide film of the metal particle can be measured from, for example, a depth profile of XPS. The "metal particle having oxide film" in the present disclosure is a general term for metal oxides, and, for example, in a case where the metal particles are Cu particles, the oxide film includes $Cu_2O$, $CuO$, $CuCO_3$, $Cu(OH)_2$, and the like.

The material of the metal particle may contain at least one element selected from copper, nickel, silver, platinum, iron, aluminum, bismuth, and palladium.

This is because copper, nickel, silver, platinum, iron, aluminum, bismuth, and palladium have an excellent heat dissipation property, and thus it is possible to obtain all-solid-state secondary batteries having excellent cycle characteristics.

The content of the metal particles may be 0.1% to 20% by weight with respect to the weight of the all-solid-state secondary battery.

When the content of the metal particles is 0.1% by weight or more with respect to the weight of the all-solid-state secondary battery, since the metal particles have an excellent heat dissipation property, the cycle characteristics are excellent. When the content is 20% by weight or less, since it is possible to decrease the internal resistance of the battery, the cycle characteristics are excellent, and it is also possible to suppress the degradation of the constituent rate of the active materials, and thus it is possible to design high capacities.

Regarding a method for calculating the content of the metal particles that are included in the all-solid-state secondary battery, a case where the metal particles are Cu particles will be described as an example.

A chip of the all-solid-state secondary battery is crushed, heated, and dissolved in an acidic solution. This solution of the all-solid-state secondary battery is weighed to a predetermined amount and further diluted up to a predetermined magnification, thereby producing measurement samples (n=4). The measurement samples are put into an inductively coupled plasma atomic emission spectrometer (manufactured by Shimadzu Corporation, ICPS-8100CL), the Cu contents of the measurement samples (n=4) are measured, and the average value thereof is regarded as the Cu content.

Here, in order to exclude the Cu content contained in the current collector layers, the Cu content of an all-solid-state secondary battery to which Cu particles having an oxide film are not added is subtracted, thereby calculating the Cu content contained in regions other than the current collector layers.

(Terminals)

For the first external terminal 6 and the second external terminal 7 in the all-solid-state lithium ion secondary battery 100, a material having a high conductivity is preferably used. It is possible to use, for example, silver (Ag), gold (Au), platinum (Pt), aluminum (Al), copper (Cu), tin (Sn), nickel (NI), or chromium (Cr). The terminals may be a single layer or a plurality of layers.

(Protective Layer)

In addition, the all-solid-state lithium ion secondary battery 100 may have a protective layer (not shown) that electrically, physically, and chemically protects the laminated body 5 or the terminals in the outer circumference of the laminated body 5. The material that forms the protective layer preferably has excellent insulating property, durability, and moisture resistance and is environmentally stable. For example, glass, ceramic, a thermosetting resin, or a photocurable resin is preferably used. For the protective layer, only one kind of material may be used or a plurality of kinds of materials may be jointly used. In addition, the protective layer may be a single layer, but a plurality of layers is preferably provided in some embodiments. Among them, an organic-inorganic hybrid in which a thermosetting resin and ceramic powder are mixed together is particularly preferred in some embodiments.

(Method for Manufacturing all-Solid-State Lithium Ion Secondary Battery)

As a method for manufacturing the all-solid-state lithium ion secondary battery 100, a simultaneous firing method may be used or a sequential firing method may be used. The simultaneous firing method is a method in which materials that form individual layers are laminated and a laminated body is produced by collective firing. The sequential firing method is a method in which individual layers are sequentially produced and a firing step is conducted every time each layer is produced. The use of the simultaneous firing method is capable of decreasing the number of operation steps for the all-solid-state lithium ion secondary battery 100. In addition, when the simultaneous firing method is used, the laminated body 5 to be obtained becomes dense. Hereinafter, the case of using the simultaneous firing method will be described as an example.

The simultaneous firing method has a step of producing pastes of individual materials that form the laminated body 5, a step of applying and drying the pastes to produce green sheets, and a step of laminating the green sheets and simultaneously firing the produced laminated sheets.

First, individual materials of the positive electrode current collector layer 1A, the positive electrode active material layer 1B, the solid electrolyte layer 3, the negative electrode active material layer 2B, the negative electrode current collector layer 2A, and the margin layer 4 are made into pastes.

A method for making the individual materials into pastes is not particularly limited. For example, the powders of the individual materials are mixed in vehicles to obtain pastes. Here, the vehicle is a collective term for media in a liquid phase. The vehicle contains a solvent and a binder. By such a method, a paste for the positive electrode current collector layer 1A, a paste for the positive electrode active material layer 1B, a paste for the solid electrolyte layer 3, a paste for the negative electrode active material layer 2B, a paste for the negative electrode current collector layer 2A, and a paste for the margin layer 4 are produced.

A method for producing the metal particles having an oxide film is not particularly limited. For example, the metal particles having an oxide film can be produced by performing an oxidation treatment on metal particles at a thermal treatment temperature of 200° C. to 400° C. in the atmospheric air or a $H_2O+N_2$ or $O_2$ atmosphere. The oxide films that are formed on the metal particle surfaces can be confirmed by, for example, XPS. In a case where oxide films having a desired film thickness cannot be obtained with a single round of the oxidation treatment, it is possible to obtain metal particles having a desired oxide film by adjusting the thermal treatment temperature, the thermal treatment time, and the number of times of the thermal treatment in various manners.

The obtained metal particles having an oxide film are mixed into one or a plurality of pastes out of the paste for the positive electrode current collector layer 1A, the paste for the positive electrode active material layer 1B, the paste for the solid electrolyte layer 3, the paste for the negative electrode active material layer 2B, the paste for the negative electrode current collector layer 2A, and the paste for the margin layer 4, whereby it is possible to obtain one or a plurality of pastes containing the metal particles having an oxide film. Before the addition of the metal particles having an oxide film, adjustment is made in advance such that the metal particles are contained in a desired content with respect to the weight of a fired all-solid-state secondary battery.

Next, green sheets are produced. The green sheets are obtained by applying the produced pastes on a base material of polyethylene terephthalate (PET) or the like in a desired order, drying the pastes as necessary, and peeling the base material. The method for applying the pastes is not particularly limited. It is possible to adopt a well-known method, for example, screen printing, application, transfer, a doctor blade, or the like.

At the time of producing the laminated body 5, it is possible to prepare a positive electrode unit and a negative electrode unit, which will be described below, and produce a laminated body.

First, the paste for the solid electrolyte layer 3 is formed into a sheet shape on a PET film by the doctor blade method and dried, thereby forming a solid electrolyte layer sheet. The paste for the positive electrode active material layer 1B is printed by screen printing on the obtained solid electrolyte layer sheet and dried, thereby forming the positive electrode active material layer 1B.

Next, the paste for the positive electrode current collector layer 1A is printed by screen printing on the obtained positive electrode active material layer 1B and dried, thereby forming the positive electrode current collector layer 1A. Furthermore, the paste for the positive electrode active material layer 1B is printed again by screen printing on the positive electrode current collector layer 1A and dried. In addition, the paste for the margin layer is screen-printed on a region of the solid electrolyte layer sheet except the positive electrode layer and dried, thereby forming a margin layer in substantially the same height as the positive electrode layer. In addition, the PET film is peeled off, thereby obtaining a positive electrode unit in which the positive electrode layer 1, in which the positive electrode active material layer 1B, the positive electrode current collector layer 1A, and the positive electrode active material layer 1B are laminated in this order, and the margin layer 4 are formed on the main surface of the solid electrolyte layer 3.

In the same sequence, a negative electrode unit in which the negative electrode layer 2, in which the negative electrode active material layer 2B, the negative electrode current collector layer 2A, and the negative electrode active material layer 2B are laminated in this order, and the margin layer 4 are formed on the main surface of the solid electrolyte layer 3 is obtained.

In addition, the positive electrode unit and the negative electrode unit are alternately laminated to be offset such that one end of the positive electrode unit does not match one end of the negative electrode unit, and a laminated body of an all-solid-state battery is produced. For the positive electrode unit or the negative electrode unit disposed at either end of the laminated body in the lamination direction, the outermost solid electrolyte layer 3B is used as the solid electrolyte layer 3, and, for the positive electrode unit or the negative electrode unit disposed between the electrode units disposed at both ends, the interlayer solid electrolyte layer 3A is used as the solid electrolyte layer 3.

The above-described manufacturing method is designed to produce a parallel-type all-solid-state battery, and, in a method for manufacturing a serial-type all-solid-state battery, the positive electrode unit and the negative electrode unit may be laminated such that one end of the positive electrode layer 1 and one end of the negative electrode layer 2 match each other, that is, are not offset.

In a case where it is desired to produce an all-solid-state secondary battery having a constitution in which the metal particles having an oxide film are not present in the surfaces of the laminated body on both ends in the lamination direction, it is simply necessary to not contain the metal particles having an oxide film in the outermost solid electrolyte layer paste.

Furthermore, it is possible to enhance adhesiveness by collectively pressurizing the produced laminated bodies by metal mold pressing, warm isostatic pressing (WIP), cold isostatic pressing (CIP), isostatic pressing, or the like. The laminated bodies are preferably pressurized while being heated and can be pressurized at, for example, 40° C. to 95° C.

The produced laminated body is cut into a chip using a dicing device and then subjected to debinding and firing, thereby producing a laminated body of an all-solid-state battery.

The produced laminated body 5 is heated, for example, to 600° C. to 1000° C. in a nitrogen atmosphere and fired, thereby obtaining a sintered body. The sintering time is set to, for example, 0.1 to 3 hours. In the case of a reducing atmosphere, the laminated body may be fired in, for example, an argon atmosphere or a mixed atmosphere of nitrogen and hydrogen instead of the nitrogen atmosphere.

Before the firing step, as a step independent from the firing step, it is possible to perform a debinding treatment. When a binder component contained in the laminated body 5 is heated and decomposed before firing, it is possible to suppress the abrupt decomposition of the binder component in the firing step. The debinding treatment is performed, for example, in a nitrogen atmosphere at a temperature range of 300° C. to 800° C. for 0.1 to 10 hours. In the case of a reducing atmosphere, the laminated body may be fired in, for example, an argon atmosphere or a mixed atmosphere of nitrogen and hydrogen instead of the nitrogen atmosphere.

The sintered body may be put into a cylindrical container together with a polishing agent such as alumina and may be barrel-polished.

In such a case, it is possible to chamfer the corners of the laminated body. As an alternative method, the sintered body may be polished by sand blasting. In this method, it is possible to scrape only a specific portion, which is preferable in some embodiments.

(Formation of Terminals)

The first external terminal 6 and the second external terminal 7 are attached to the sintered laminated body 5 (sintered body). The first external terminal 6 and the second external terminal 7 are formed so as to be electrically in contact with the positive electrode current collector layer 1A and the negative electrode current collector layer 2A, respectively. For example, it is possible to form the first external terminal 6 and the second external terminal 7 on the positive electrode current collector layer 1A and the negative electrode current collector layer 2A exposed from the side surfaces of the sintered body by well-known means such as a sputtering method, a dipping method, or a spray coating method.

In the case of forming the first external terminal 6 and the second external terminal 7 only in a predetermined portion, the first external terminal 6 and the second external terminal 7 are formed after the side surfaces are masked or the like with tape.

Hitherto, the embodiment of the present disclosure has been described in detail with reference to the drawing, but each constitution in each embodiment, a combination thereof, and the like are examples, and the addition, omission, substitution, and other modification of the constitution are possible within the scope of the gist of the present disclosure.

EXAMPLES

Examples 1 to 6

(Production of Cu Particles Having Oxide Film)

As Cu particles having an oxide film according to Examples 1 to 6, Cu particles having a diameter of 1 μm were oxidized at a thermal treatment temperature of 200° C. in an $N_2$ atmosphere. As described above, whether or not there were oxide films on the particle surfaces of the treated particles was checked with an XPS device (manufactured by ULVAC-PHI, Inc., PHIQuanteraII), and metal particles having a 0.01 μm-thick oxide film were produced by adjusting a condition until a desired film thickness was obtained.

(Production of Paste for Outermost Solid Electrolyte Layer)

For the production of an outermost solid electrolyte layer paste, $Li_{1+x}Al_xTi_{2-x}(PO_4)_3$ (0≤x≤0.6) and the Cu particles having an oxide film were mixed together at predetermined ratio by weight, and then ethanol (100 parts) and toluene (200 parts) were added thereto as solvents with respect to 100 parts of the powder of the mixture and mixed with a ball mill by wet blending. After that, a polyvinyl butyral-based binder (16 parts) as a binder and benzyl butyl phthalate (4.8 parts) as a plasticizer were further injected thereinto and mixed, thereby preparing the outermost solid electrolyte layer paste. Before the addition of the Cu particles having an oxide film, adjustment was made in advance such that the Cu particles reached a content shown in Table 1 with respect to the weight of a fired all-solid-state secondary battery.

This paste for the outermost solid electrolyte layer was molded into a sheet on a PET film, which was a base material, by the doctor blade method, and an outermost solid electrolyte layer sheet was obtained. The thickness of the outermost solid electrolyte layer sheet was set to 15 μm.

(Production of Paste for Interlayer Solid Electrolyte Layer)

An interlayer solid electrolyte layer paste was produced by the same method as in the production of the outermost solid electrolyte layer paste except that the Cu particles having an oxide film were not mixed.

This paste for the interlayer solid electrolyte layer was molded into a sheet on a PET film, which was a base material, by the doctor blade method, and an interlayer solid electrolyte layer sheet was obtained. The thickness of the interlayer solid electrolyte layer sheet was set to 15 μm.

(Production of Paste for Positive Electrode Active Material Layer and Paste for Negative Electrode Active Material Layer)

A paste for a positive electrode active material layer and a paste for a negative electrode active material layer were produced by mixing $Li_3V_2(PO_4)_3$ at a predetermined weight rate, then adding ethyl cellulose (15 parts) as a binder and dihydroterpineol (65 parts) as a solvent with respect to 100 parts of the powder of $Li_3V_2(PO_4)_3$, and mixing and dispersing the components.

(Production of Paste for Positive Electrode Current Collector and Paste for Negative Electrode Current Collector)

A paste for a positive electrode current collector and a paste for a negative electrode current collector were both produced by mixing Cu including no oxide film and $Li_3V_2(PO_4)_3$ such that the volume rates reached 80/20, then adding ethyl cellulose (10 parts) as a binder and dihydroterpineol (50 parts) as a solvent with respect to 100 parts of the powder of the mixture, and mixing and dispersing the components.

(Production of Electrode Units)

A positive electrode unit and a negative electrode unit were each produced as described below.

The paste for the active material was printed in a thickness of 5 μm by screen printing on the solid electrolyte layer sheet. Next, the printed paste for the active material was dried at 80° C. for five minutes, and the paste for the current collector was printed in a thickness of 5 μm by screen printing on the paste for the active material. Next, the printed paste for the current collector was dried at 80° C. for five minutes, and furthermore, the paste for the active material was printed again in a thickness of 5 μm by screen printing on the paste for the current collector. The printed active material paste was dried at 80° C. for five minutes, and then the PET film was peeled off. Sheets of the electrode units, in which the paste for the active material, the paste for the current collector, and the paste for the active material were printed and dried in this order on the solid electrolyte layer sheet, were obtained.

(Production of Laminated Body)

Five solid electrolyte layer sheets for the outermost solid electrolyte layer 3B were overlapped, and 20 active material units (10 positive electrode units and 10 negative electrode units) were alternately stacked across the interlayer solid electrolyte layer 3A on the overlapped solid electrolyte layer sheets. At this time, the individual units were unevenly stacked such that the current collector paste layers of the nth (n=odd number) active material units extended up to only one end surface and the current collector paste layers of the nth (n=even number) active material units extended up to only the other end surface. Six solid electrolyte layer sheets for the outermost solid electrolyte layer 3B were stacked on these stacked units. After that, the stacked solid electrolyte layer sheets and the stacked units were molded by thermocompression bonding and then cut, thereby producing laminated chips. After that, the laminated chips were simultaneously fired to obtain the laminated bodies 5. In the simultaneous firing, the temperature was raised up to a firing temperature of 840° C. at a temperature rise rate of 200° C./hour in a nitrogen atmosphere, and the laminated chips were held at the firing temperature for two hours and naturally cooled after firing.

(Production and Evaluation of all-Solid-State Secondary Batteries)

A first external terminal and a second external terminal were attached to each of the sintered laminated bodies (sintered bodies) by a well-known method, thereby producing an all-solid-state secondary battery.

A lead wire was attached to each of the first external terminal and the second external terminal, and a charge and discharge test was performed, thereby measuring the initial discharge capacity and the capacity retention rate after 500 cycles of the all-solid-state secondary battery. Regarding the measurement conditions, the currents during charging and discharging were set to 2.0 μA, respectively, and the final voltages during charging and discharging were set to 1.6 V and 0 V, respectively. The results are shown in Table 1. The capacity at the time of first discharging was regarded as the initial discharge capacity. In addition, the capacity retention rate was obtained by dividing the discharge capacity at the $500^{th}$ cycle by the initial discharge capacity.

In addition, the percentages (short circuit rates) of short-circuited all-solid-state secondary batteries in the evaluated all-solid-state secondary batteries are also shown in Table 1.

Comparative Example 1

Comparative Example 1 is different from Example 1 in terms of the fact that the Cu particles having an oxide film were not included in the paste for the outermost solid electrolyte layer. The other conditions were the same as in Example 1.

TABLE 1

| | Kind of metal particles contained | Average particle diameter [μm] | Average thickness rate of oxide film [%] | Average thickness of oxide film [μm] | Metal particle-containing layer | Content [% by weight] | Short circuit rate [%] | Initial discharge capacity [μAh] | Capacity retention rate at $500^{th}$ cycle [%] |
|---|---|---|---|---|---|---|---|---|---|
| Example 1 | Cu | 1 | 1 | 0.01 | Outermost solid electrolyte layer | 0.05 | 0 | 108 | 95 |
| Example 2 | Cu | 1 | 1 | 0.01 | Outermost solid electrolyte layer | 0.1 | 0 | 108 | 98 |
| Example 3 | Cu | 1 | 1 | 0.01 | Outermost solid electrolyte layer | 1 | 0 | 108 | 98 |
| Example 4 | Cu | 1 | 1 | 0.01 | Outermost solid electrolyte layer | 10 | 0 | 107 | 97 |
| Example 5 | Cu | 1 | 1 | 0.01 | Outermost solid electrolyte layer | 20 | 0 | 105 | 95 |
| Example 6 | Cu | 1 | 1 | 0.01 | Outermost solid electrolyte layer | 30 | 0 | 105 | 94 |
| Comparative Example 1 | — | — | — | — | — | 0 | 0 | 100 | 90 |

The "average thickness of oxide film" in Table 1 is the average thickness of the oxide films measured from the depth profiles of an XPS device regarding 20 metal particles.

The "average particle diameter" in Table 1 is the average particle diameter of the metal particles measured with a FE-SEM device (manufactured by Hitachi High-Tech Corporation, SU8220) regarding 20 metal particles.

The "average thickness rate of oxide film" in Table 1 is the percentage of the "average thickness of oxide film" with respect to the "average particle diameter" of the metal particles.

The "content" in Table 1 is the percentage of the weight of the metal particles with respect to the weight of the all-solid-state secondary battery.

The "short circuit rate" in Table 1 is the percentage of all-solid-state secondary batteries short-circuited after the production or during charge and discharge cycles in the plurality of all-solid-state secondary batteries produced under the same conditions.

As is clear from Table 1, when Examples 1 to 6 and Comparative Example 1 are compared, both the initial discharge capacities and the capacity retention rates after 500 cycles improved more in Examples 1 to 6 including the Cu particles having an oxide film than in Comparative Example 1 not including the Cu particles having an oxide film.

For Examples 7 to 33, all-solid-state secondary batteries were produced in the same manner as in Examples 1 to 6 except that the conditions shown in Table 2 to Table 5 were different.

First, the results of the same evaluation performed on cases where the Cu particles having an oxide film were included in different layers are shown in Table 2.

Examples 7 to 11 are cases where the Cu particles having an oxide film were included in the outermost solid electrolyte layer, in the positive electrode active material layer, in the negative electrode active material layer, in the interlayer solid electrolyte layer, in the margin layer, and in the outermost solid electrolyte layer, the positive electrode active material layer, the negative electrode active material layer, the interlayer solid electrolyte layer, and the margin layer.

TABLE 2

|  | Kind of metal particles contained | Average particle diameter [μm] | Average thickness rate of oxide film [%] | Average thickness of oxide film [μm] | Metal particle-containing layer | Content [% by weight] | Short circuit rate [%] | Initial discharge capacity [μAh] | Capacity retention rate at 500$^{th}$ cycle [%] |
|---|---|---|---|---|---|---|---|---|---|
| Example 3 | Cu | 1 | 1 | 0.01 | Outermost solid electrolyte layer | 1 | 0 | 108 | 98 |
| Example 7 | Cu | 1 | 1 | 0.01 | Positive electrode active material layer | 1 | 0 | 107 | 97 |
| Example 8 | Cu | 1 | 1 | 0.01 | Negative electrode active material layer | 1 | 0 | 107 | 97 |
| Example 9 | Cu | 1 | 1 | 0.01 | Interlayer solid electrolyte layer | 1 | 0 | 106 | 96 |
| Example 10 | Cu | 1 | 1 | 0.01 | Margin layer | 1 | 0 | 108 | 96 |
| Example 11 | Cu | 1 | 1 | 0.01 | Outermost solid electrolyte layer/positive electrode layer/negative electrode layer/interlayer solid electrolyte layer/margin layer | 1 | 0 | 107 | 95 |

As is clear from Table 2, among Example 3 and Examples 7 to 11, in Example 3, the Cu particles having an oxide film were included only in the outermost solid electrolyte layer, and the initial discharge capacity and the capacity retention rate after 500 cycles were both the highest.

Next, the results of the same evaluation performed on cases where the average particle diameter of the Cu particles having an oxide film was different are shown in Table 3. The Cu particles having an oxide film were included only in the outermost solid electrolyte layer.

TABLE 3

|  | Kind of metal particles contained | Average particle diameter [μm] | Average thickness rate of oxide film [%] | Average thickness of oxide film [μm] | Metal particle-containing layer | Content [% by weight] | Short circuit rate [%] | Initial discharge capacity [μAh] | Capacity retention rate at 500$^{th}$ cycle [%] |
|---|---|---|---|---|---|---|---|---|---|
| Example 12 | Cu | 0.05 | 20 | 0.01 | Outermost solid electrolyte layer | 1 | 0 | 105 | 97 |
| Example 13 | Cu | 0.1 | 10 | 0.01 | Outermost solid electrolyte layer | 1 | 0 | 108 | 99 |
| Example 3 | Cu | 1 | 1 | 0.01 | Outermost solid electrolyte layer | 1 | 0 | 108 | 98 |
| Example 14 | Cu | 10 | 0.1 | 0.01 | Outermost solid electrolyte layer | 1 | 0 | 108 | 97 |
| Example 15 | Cu | 20 | 0.05 | 0.01 | Outermost solid electrolyte layer | 1 | 0 | 107 | 96 |
| Example 16 | Cu | 30 | 0.03 | 0.01 | Outermost solid electrolyte layer | 1 | 0 | 103 | 96 |

As is clear from Table 3, in Example 3 and Examples 13 to 15, the average particle diameters of the Cu particles having an oxide film were 0.1 μm to 20 μm, and the initial discharge capacity and the capacity retention rate after 500 cycles were high. In Example 12, the average particle diameter was 0.05 μm, and the initial discharge capacity was low compared with Examples 3 and 13 to 15. In addition, in Example 16, the average particle diameter was 30 μm, and the initial discharge capacity was low compared with Examples 3 and 13 to 15.

Next, the results of the same evaluation performed on cases where the average thickness rate of the oxide films of the Cu particles having an oxide film was different are shown in Table 4. In addition, the results of the same evaluation performed on cases where the average particle diameters of the Cu particles having an oxide film were 0.1 μm, and 20 respectively, are shown in the same table. The Cu particles having an oxide film were included only in the outermost solid electrolyte layer.

Comparative Example 2

In addition, as Comparative Example 2, the results of the same evaluation performed on a case where Cu particles not having an oxide film were included in the outermost solid electrolyte layer are shown in Table 4.

In Comparative Example 2, in a stage before the Cu particles were mixed into the paste for the outermost solid electrolyte layer, a reduction treatment was performed at a thermal treatment temperature of 200° C. in a $N_2+H_2$ mixed atmosphere, and it was confirmed by XPS that there was no oxide film on the particle surfaces. In a case where the oxide film was not reduced with a single round of the reduction treatment, the thermal treatment temperature, the thermal treatment time, and the number of times of the thermal treatment were adjusted in various manners, thereby producing Cu particles not having an oxide film.

As is clear from Table 4, in Examples 13, 17, and 18, when the average particle diameters of the Cu particles having an oxide film were 0.1 μm and the average thickness rate of the oxide film was 1%, 5%, or 10%, compared with Example 19 in which the average thickness rate of the oxide film was 15%, the initial discharge capacities and the capacity retention rates after 500 cycles were high. Similarly, in Examples 3, 20, and 21, when the average particle diameters of the Cu particles having an oxide film were 1 μm and the average thickness rate of the oxide film was 1%, 5%, or 10%, compared with Example 22 in which the average thickness rate of the oxide film was 15%, the initial discharge capacities and the capacity retention rates after 500 cycles were high. In addition, in Examples 23 to 25, when the average particle diameters of the Cu particles having an oxide film were 20 μm and the average thickness rate of the oxide film was 1%, 5%, or 10%, compared with Example 26 in which the average thickness rate of the oxide film was 15%, the initial discharge capacities and the capacity retention rates after 500 cycles were high.

On the other hand, in Comparative Example 2, the same results as in Example 20 were obtained in terms of the initial discharge capacities and the capacity retention rates after 500 cycles, but short circuiting occurred at a percentage of 5%.

The results of the same evaluation performed on cases where the Cu particles having an oxide film were changed to other metal particles having an oxide film are shown in Table 5.

TABLE 4

| | Kind of metal particles contained | Average particle diameter [μm] | Average thickness rate of oxide film [%] | Average thickness of oxide film [μm] | Metal particle-containing layer | Content [% by weight] | Short circuit rate [%] | Initial discharge capacity [μAh] | Capacity retention rate at 500$^{th}$ cycle [%] |
|---|---|---|---|---|---|---|---|---|---|
| Example 17 | Cu | 0.1 | 1 | 0.001 | Outermost solid electrolyte layer | 1 | 0 | 108 | 99 |
| Example 18 | Cu | 0.1 | 5 | 0.005 | Outermost solid electrolyte layer | 1 | 0 | 107 | 99 |
| Example 13 | Cu | 0.1 | 10 | 0.010 | Outermost solid electrolyte layer | 1 | 0 | 108 | 99 |
| Example 19 | Cu | 0.1 | 15 | 0.015 | Outermost solid electrolyte layer | 1 | 0 | 106 | 96 |
| Example 3 | Cu | 1 | 1 | 0.01 | Outermost solid electrolyte layer | 1 | 0 | 108 | 98 |
| Example 20 | Cu | 1 | 5 | 0.05 | Outermost solid electrolyte layer | 1 | 0 | 108 | 98 |
| Example 21 | Cu | 1 | 10 | 0.1 | Outermost solid electrolyte layer | 1 | 0 | 107 | 97 |
| Example 22 | Cu | 1 | 15 | 0.15 | Outermost solid electrolyte layer | 1 | 0 | 106 | 95 |
| Example 23 | Cu | 20 | 1 | 0.2 | Outermost solid electrolyte layer | 1 | 0 | 108 | 98 |
| Example 24 | Cu | 20 | 5 | 1 | Outermost solid electrolyte layer | 1 | 0 | 109 | 98 |
| Example 25 | Cu | 20 | 10 | 2 | Outermost solid electrolyte layer | 1 | 0 | 107 | 96 |
| Example 26 | Cu | 20 | 15 | 3 | Outermost solid electrolyte layer | 1 | 0 | 106 | 93 |
| Comparative Example 2 | Cu | 1 | 0 | 0 | Outermost solid electrolyte layer | 1 | 5 | 107 | 97 |

TABLE 5

|  | Kind of metal particles contained | Average particle diameter [μm] | Average thickness rate of oxide film [%] | Average thickness of oxide film [μm] | Metal particle-containing layer | Content [% by weight] | Short circuit rate [%] | Initial discharge capacity [μAh] | Capacity retention rate at 500$^{th}$ cycle [%] |
|---|---|---|---|---|---|---|---|---|---|
| Example 3 | Cu | 1 | 1 | 0.01 | Outermost solid electrolyte layer | 1 | 0 | 108 | 98 |
| Example 27 | Ni | 1 | 1 | 0.01 | Outermost solid electrolyte layer | 1 | 0 | 105 | 96 |
| Example 28 | Fe | 1 | 1 | 0.01 | Outermost solid electrolyte layer | 1 | 0 | 106 | 95 |
| Example 29 | Ag | 1 | 1 | 0.01 | Outermost solid electrolyte layer | 1 | 0 | 109 | 98 |
| Example 30 | Pt | 1 | 1 | 0.01 | Outermost solid electrolyte layer | 1 | 0 | 105 | 96 |
| Example 31 | Al | 1 | 1 | 0.01 | Outermost solid electrolyte layer | 1 | 0 | 107 | 97 |
| Example 32 | Bi | 1 | 1 | 0.01 | Outermost solid electrolyte layer | 1 | 0 | 106 | 97 |
| Example 33 | Pd | 1 | 1 | 0.01 | Outermost solid electrolyte layer | 1 | 0 | 105 | 96 |

As is clear from Table 5, in Examples 27 to 33, when the kind of metal that formed the metal particles having an oxide film was Ni, Fe, Ag, Pt, Al, Bi, or Pd, the initial discharge capacities and capacity retention rates after 500 cycles that were obtained were practically the same as in a case where the kind of metal was Cu.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte layer
3A Interlayer solid electrolyte layer
3B Outermost solid electrolyte layer
4 Margin layer
5 Laminated body
10 Metal particles

The invention claimed is:

1. An all-solid-state secondary battery comprising:
a laminated body in which
a plurality of positive electrode layers, each positive electrode layer including a positive electrode current collector layer and a positive electrode active material layer, and
a plurality of negative electrode layers, each negative electrode layer including a negative electrode current collector layer and a negative electrode active material layer;
are laminated with a plurality of solid electrolyte layers each containing a solid electrolyte interposed between each positive electrode layer and each negative electrode layer; and
a plurality of margin layers each of which is disposed side by side with each of the positive electrode layers and the negative electrode layers and contains a solid electrolyte,
wherein the laminated body includes metal particles having an oxide film in at least any layer of the positive electrode active material layers, the negative electrode active material layers, the solid electrolyte layers, and the margin layers, and
wherein each margin layer of the plurality of margin layers is located between two solid electrolyte layers and contiguous therewith, in a lamination direction,
wherein each of the metal particles having an oxide film includes a metal particle and the oxide film, and the metal particle is covered with the oxide film,
wherein an average thickness of the oxide film is 10% or less of an average particle diameter of the metal particles having an oxide film and the average thickness of the oxide film is within a range of 0.001 μm to 2 μm, and
wherein the metal particles having an oxide film are present in all of the solid electrolyte layers and the margin layers.

2. The all-solid-state secondary battery according to claim 1,
wherein the metal particles having the oxide film are also provided in surfaces of the laminated body at both ends in the lamination direction.

3. The all-solid-state secondary battery according to claim 1,
wherein the average particle diameter of the metal particles having the oxide film is 0.1 μm to 20 μm.

4. The all-solid-state secondary battery according to claim 1,
wherein the metal particles contain at least one element selected from copper, nickel, silver, platinum, iron, aluminum, bismuth, and palladium.

5. The all-solid-state secondary battery according to claim 1,
wherein a content of the metal particles is 0.1% to 10% by weight with respect to a weight of the all-solid-state secondary battery.

6. The all-solid-state secondary battery according to claim 1,
wherein the metal particles having an oxide film are present in all of the positive electrode active material layers, the negative electrode active material layers, the solid electrolyte layers, and the margin layers.

* * * * *